Jan. 28, 1969  T. H. BERNATZ ET AL  3,424,076
APPARATUS FOR MAKING A TORTILLA PRODUCT
Filed Nov. 21, 1966
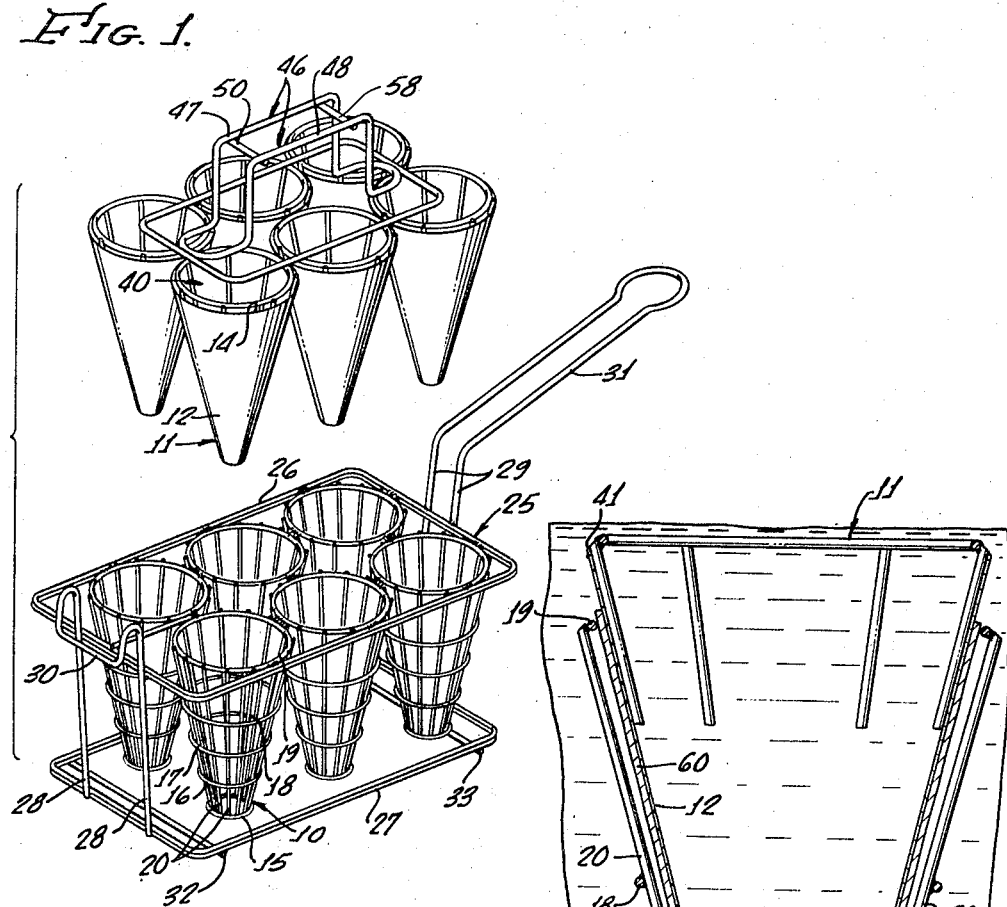
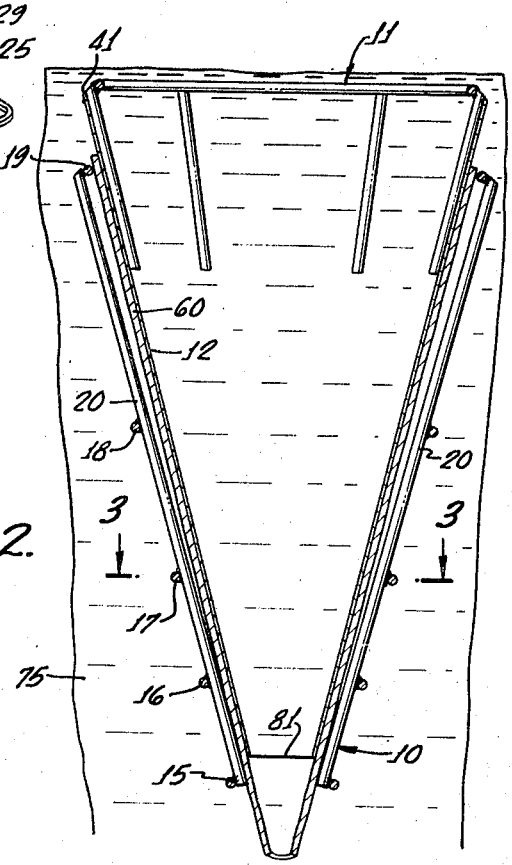
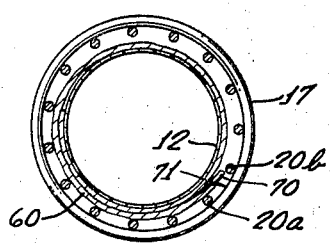
INVENTOR.
THOMAS H. BERNATZ
GERALD A. BRADY
BY
FOWLER, KNOBBE
& MARTENS
ATTORNEYS.

United States Patent Office 3,424,076
Patented Jan. 28, 1969

3,424,076
APPARATUS FOR MAKING A TORTILLA PRODUCT
Thomas H. Bernatz, 18322 Peralta Hills Drive, Anaheim, Calif. 92806, and Gerald A. Brady, 1247 St. James, Orange, Calif. 92667
Filed Nov. 21, 1966, Ser. No. 595,768
U.S. Cl. 99—416      16 Claims
Int. Cl. A47j 37/12; 36/22; A21b 5/02

ABSTRACT OF THE DISCLOSURE

This invention relates to an apparatus for forming a novel tortilla product and particularly to a crisp, stiff shell having a pair of sides which overlap to form a conically-shaped edible container in which additional foodstuffs may be confined.

Summary of the invention

Briefly, in accordance with a preferred embodiment of this invention, the apparatus comprises a generally conically-shaped receptacle of an open framework construction and a generally conically-shaped retainer member. This latter member has a substantially continuous exterior surface dimensioned to fit concentrically within the open receptacle. The tortilla shells are made by first forming a soft, pliable tortilla so that a pair of its sides overlap to form a generally conical shape within the open receptacle, and then inserting the retainer member within the interior of the formed tortilla. This assembly is submerged into a liquid, heated oil until the tortilla is fried into a crisp shell with the receptacle and retainer members cooperating to provide the desired conically configured shell, and, in addition, preventing the shell from floating about in the frying medium. Following completion of the frying step, the assembly is removed from the liquid and taken apart so as to release the formed tortilla shell.

An important feature of the apparatus of this invention is that it facilitates removal of the conically-formed tortilla shell from the assembly after frying, thereby avoiding adhesion of the formed shell to either the open framework of the receptacle or the juxtaposed exterior surface of the retainer member. Thus, the tortilla draws to the inner retainer member while frying in the apparatus of this invention. In this manner, the formed tortilla, upon completion of the frying step, is drawn sufficiently away from the open framework receptacle so that there is no problem of its becoming stuck or wedged thereto. The conical retainer member, having a smooth and continuous outer surface, is very easily removed from the surrounding tortilla.

Another of the significant aspects of this invention is the formed, conically-shaped deep fried tortila shell. This shell serves as an edible component of a new food product which is obtained when the shell is substantialy filled with additional foodstuffs such as cooked beans and a topping of particles of cheese. In addition to its savoury characteristics, this food product is an excellent nutriment, is portable, and presents an appetizing appearance.

A further advantage of the invention is that these formed tortilla shells may be quickly and inexpensively manufactured, whereby the finished food product may be offered to the consumer at a very reasonable cost.

A plurality of framework receptacle members may be secured together in the same plane and likewise, a plurality of retainer members may be joined together in unison to nestle in corresponding ones of the framework members. A tortilla is placed in each receptacle and the entire assembly submerged in the frying member to produce a plurality of the crisp, conically configured tortilla shells in a single frying operation.

A more thorough understanding of the apparatus, food product of this invention may be obtained from the following detailed description taken in conjunction with the accompanying drawings, in which:

FIG. 1 is a view in perspective of the preferred apparatus of this invention for making a plurality of crisp, stiff conically-shaped tortilla shells;

FIG. 2 is a view in cross-section showing the manner in which a pliable tortilla is supported between the open framework member and the retainer member in the liquified heated frying medium;

FIG. 3 is a cross-sectional view taken along line 3—3 of FIG. 2;

Figure 4A:
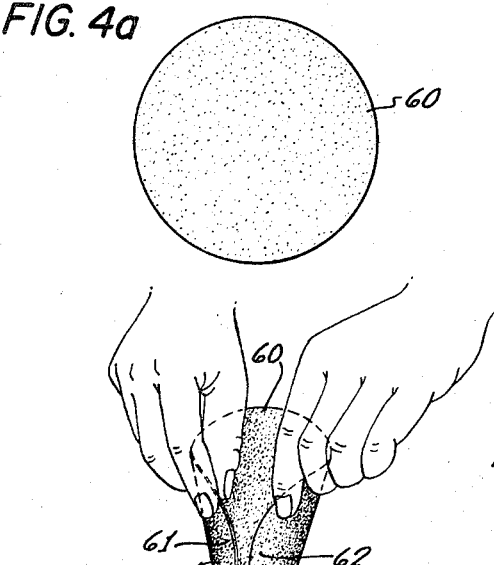
Figure 4B:
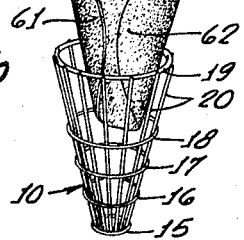
Figure 5A:
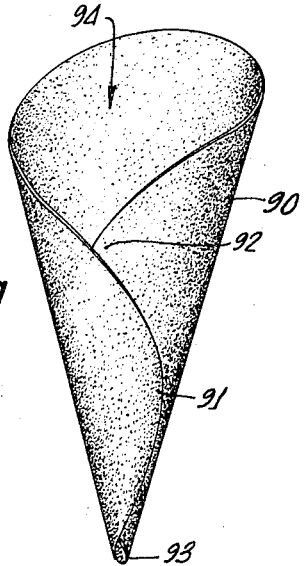
Figure 5B:
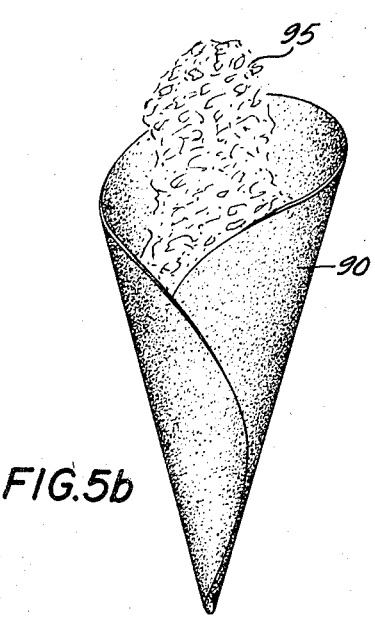

FIGS. 4a, b, c, d, e and f illustrate successive steps in the method of forming the stiff, conically-shaped deep-fried shell in accordance with the method and apparatus of this invention; and FIGS. 5a, b, c and d illustrate successive steps in the manufacture of the preferred food product formed from the conically-shaped deep-fried shell.

Detailed description

Referring now to FIG. 1, the assembly for changing a soft, pliable tortilla into a crisp, stiff conically-shaped shell comprises a generally truncated, conical-shaped open framework 10 forming a female receptacle and a male retainer member 11 having a smooth, substantially continuous, truncated conical-shaped exterior surface 12 dimensioned to fit concentrically within the female receptacle 10. The framework forming the female receptacle is advantageously constructed from a series of wire rings 15, 16, 17, 18 and 19 of increasing diameter mounted in a spaced, coaxial relationship with their planes generally perpendicular to the axis of the receptacle by a series of spaced apart upright supports 20 welded to the rings.

Each of the rings 15, 16, 17 and 18 are located exterior of the upright members 20, whereas ring 19 is formed interior of these members. Ring 19 has a continuous inner peripheral surface forming the open mouth of the receptacle and facilitates guiding the pliable tortilla into the receptacle by preventing the soft, pliable tortilla from contacting the ends of any of the wire uprights 20 when the tortilla is being inserted into the female receptacle. The receptacle 10 terminates at ring 15. This, the smallest of the rings, has an opening sufficiently large that the vertex of the formed tortilla extends therethrough. Also, as described in more detail below, ring 17 is vertically positioned to provide a circumferential member proximate thee middle of the folded tortilla to prevent the overlapping edge of the tortilla from extending through the open cage and becoming "hung up" or fastened to the cage structure.

Individual ones of these open framework receptacles 10 are joined together on the same plane and attached to a supporting frame 25 comprised of an upper, generally rectangular frame 26 horizontally supported to a generally rectangular base 27 by a pair of uprights 28 located at one end of the upper and lower frame members and another pair of uprights 29 located at the other end of these members. Uprights 28 and 29 are continuous at their upper portion, uprights 28 being bent to form a hook 30 at one end of the assembly of female receptacles, and uprights 29 being bent in to substantially a horizontal plane to form a manipulating handle 31 at the other end of this assembly. A pair of rods 32, 33 are welded to the bottom of the lower frame 27 and serve as base supports. The uprights 28, 29 and the upper framework 26 are so dimensioned that the bottom portions of the suspended female receptacles 10 are spaced above the bottom of these base supports.

The retainer member is advantageously constructed with an inner, conically-configured framework 40 over which is secured a smooth metal sheet 41 formed into a truncated, conical configuration substantially similar to the interior conical configuration of the female receptacle. A plurality of these male retainer members are joined in unison in positions respectively corresponding to the female receptacles. The group of male retainer members is attached to a handle assembly comprising a rectangular frame 45 and a pair of vertically-extending handles 46 constructed from a continuous length of rod to form a pair of inverted U-shaped members 47, 48 welded to the rectangular frame. Transverse rods 50, 51 mounted at opposite ends of the base of the U-configuration maintain a fixed space between members 47 and 48. This handle assembly is secured across the top mouths of each of the male members, thereby not only providing a handle for the male retainer members, but also serving to increase the overall rigidity of the grouping.

Advantageously, the female receptacle and its frame members and handle assembly, and the frame and handle assembly of the male retainer member are constructed of stainless steel wire and rod and integrally joined such as by welding. The shaped metal 41 of the male member is preferably formed of stainless steel sheet. The resulting apparatus is rigid, durable, and easy to keep clean, as well as being relatively light and portable.

The method for changing the soft, pliable tortilla to a stiff conical shell comprises a series of steps illustrated in the successive illustrations of FIGS. 4a, b, c, d, e and f. The soft tortilla—generally a thin, flat circular shaped member 60 of corn or flour dough as seen in FIG. 2a—is quite pliable and easily preformed into a generally conical container configuration within the female receptacle. This step is conveniently performed by holding diametrically opposed sides 61, 62 of the tortilla with respective hands as shown in FIG. 2b and folding the tortilla together until one side overlaps the other to form a generally rolled configuration. This rolled tortilla is placed into the female receptacle 10 with the longitudinal axis of the tortilla in general alignment with that of the receptacle. As noted above, the entry of the formed tortilla into the receptacle is facilitated by the uppermost ring 19 which is located interior of the upright supports 20 and provides a smooth, continuous guide into the receptacle for preventing the tortilla from engaging the ends of the uprights 20 and becoming snagged or torn.

Figure 4C:
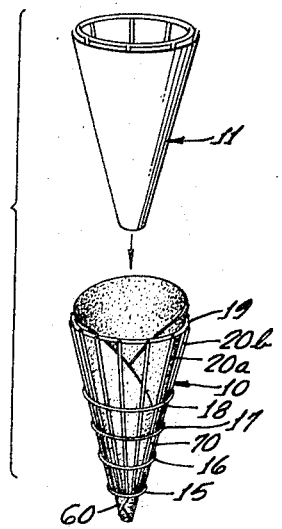
Figure 4D:
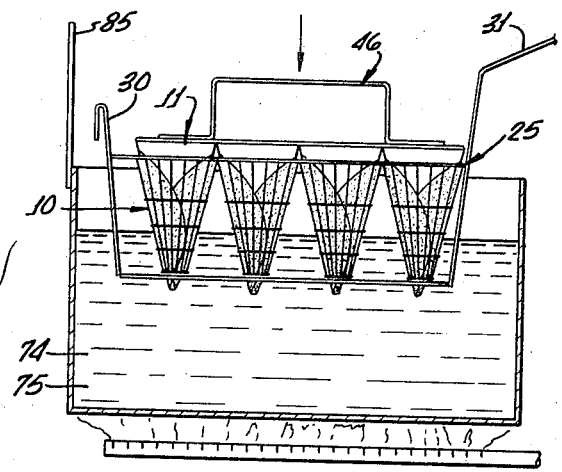
Figure 4E:
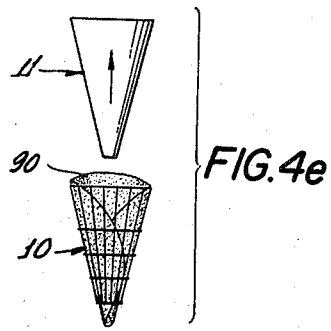

The tortilla in the female receptacle assumes the position shown in FIGS. 2 and 4c, with the vertex at the bottom closed or nearly closed, the top of the tortilla forming an open mouth, and opposite sides of the tortilla being overlapped. Because of the open construction of the receptacle and the pliable nature of the tortilla, the exterior overlapping side 70 at the middle of the tortilla may have a tendency to bias diametrically outwardly between adjacent uprights 20a and 20b (FIGS. 3 and 4c). This tendency is overcome by locating the ring 17 at the middle of the tortilla, thereby preventing displacement of the tortilla side 70 past the interior surface 71 of ring 18 (see FIG. 3).

After each of the female receptacles 10 is provided with an inner tortilla lining in the manner described above, each of the male retainer members 11 are aligned with respective ones of the female receptacles 10 and lowered (FIG. 4c) into the interior of the formed tortilla. The assembly, with each of the male members nestled in a corresponding tortilla and female receptacle, is lifted by handle 31 and totally submerged in a heated receptacle 74 containing a liquified cooking fat or oil 75. The upper temperature limit of the oil is determined by its breakdown, or burning temperature, and the lower temperature is limited to that in which the shell does not fry to a stiff, crisp member. By way of specific example, the liquified frying medium may be substantially 100% vegetable shortening or oil heated to a temperature of 350° F. although this temperature may generally range from approximately 330° to 370° F. A particular advantage of the assembly described herein is that it may be used in conjunction with most commercial fryers in use in restaurants and diners throughout the country.

The manner in which the female receptacle, tortilla and male retainer member are spatially-oriented within the cooking oil is shown in the cross-sectional views of FIGS. 2 and 3. The vertex of the formed tortilla 60 extends below ring 15 to form the closed or nearly closed end 93. The male retainer 11 loosely rests in the interior of the tortilla, its weight being sufficient to maintain it in position in the cooking fluid. At first, the tortilla rests closely adjacent the open framework 10, but during the cooking process, the tortilla draws away from the open female receptacle and up to the exterior surface 12 of the male retainer member, this being the position shown in FIGS. 2 and 3.

The tortilla is left in the heated oil until it becomes crisp. As the tortillas fry, bubbles rise to the surface of the cooking medium 75. Best results have been obtained by frying the tortillas until these bubbles have almost ceased. The entire assembly is then lifted from the liquid 75 by the handle 31 and allowed to drain over the fryer. This latter step is advantageously provided by engaging the hook 30 over the back edge 85 of the receptacle 74. The male assembly member 11 is then separated from the female member 10 (FIG. 43) leaving the fried tortillas either in the female receptacle or loosely adhered to the male retainer. The assembly containing the female members is then inverted (FIG. 4f) and the completed conically-shaped tortillas 90 dropped onto a clean surface. As shown in FIG. 5a, these shells have a pair of overlapping sides 91, 92, a substantially closed vertex 93 and a large open mouth 94.

Figure 4F:
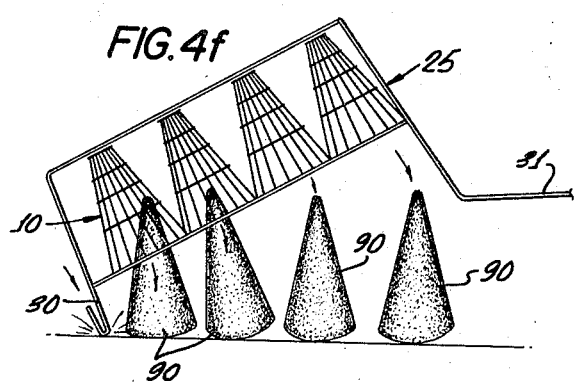

A significant feature of the method and apparatus of this invention is the ease of removal of the conically-formed tortillas from the male and female halves of the apparatus. As previously noted, while frying in the heated oil, the tortillas have been found to draw away from the open female receptacle and up to the male retainer member. Accordingly, a tolerance is provided between the exterior surface of the tortilla and the open framework female receptacle as shown in FIG. 2 so any adhesion such as by sticking or binding of the tortilla to the open wire receptacle is avoided, while the smooth, substantially continuous outer surface 12 of the male retainer member maintains the desired form of the tortilla while preventing the tortilla from becoming closely adhered thereto. With the apparatus of this invention, the tortilla is usually so loosely adhered to the apparatus that it customarily either separates from the male member when the male and female members are disjoined at the completion of the frying operation, or from the female receptacle when the latter is inverted as shown in FIG. 4f.

Another advantage of the assembly shown in FIG. 1 is that the cooking oil freely circulates through the open construction of the female receptacle assembly and through the opening 81 provided at the bottom of the male retainer member, to surround the entire conically formed tortilla; yet, as best shown in FIG. 2, the assembly retains the tortilla in the desired conical configuration while it is entirely submerged in the heated oil.

Figure 5C:
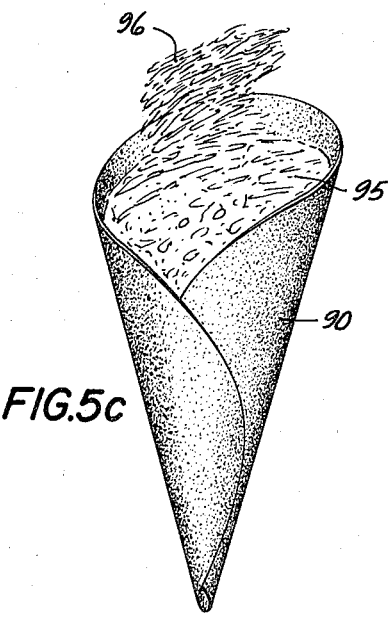
Figure 5D:
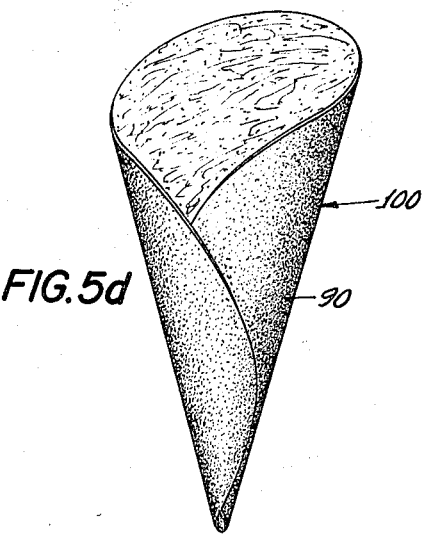

The novel food product made from the stiff, conically-shaped tortilla shell 90 is made in the following manner: cooked beans 95 are first poured through the mouth 94 of the shell into its interior so as to fill a substantial portion thereof. These beans are preferably pinto beans which have been previously boiled with lard, meat grease and salt, until they are soft and easy to mash—generally, a cooking time of three to three-and-a-half hours is required—and then whipped to a consistency of mashed potatoes. Grated cheddar cheese 96 is preferably sprinkled over the top of the filling of beans 95, covering substantially the upper surface of the beans (FIG. 5c). The resultant product 100, shown in FIG. 5d, has a number of advantages, among which are a very substantial savoury appeal, a high nutritional value and an appetizing appearance. In addition, this product is quite portable, being easily carried in one hand, and can be made quite inexpensively.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. An assembly for changing a pliable tortilla into a crisp, stiff conically-shaped shell comprising:
   a truncated conical-shaped open framework forming a receptacle in which an oppositely disposed pair of sides of the pliable tortilla are overlapped to form said tortilla into a conically-shaped container configuration, and
   a truncated conical-shaped retainer member having a substantially continuous, smooth exterior surface dimensioned to fit within the pliable tortilla formed in said open framework,
      said assembly being arranged to be totally submerged in a liquified, heated cooking medium for frying said pliable tortilla into a crisp, conically-shaped shell, said tortilla drawing up to the smooth exterior surface of said retainer member and away from the open framework during frying to prevent adhesion of the fried shell to said assembly.

2. An assembly for changing a pliable tortilla into a crisp, stiff conically-shaped shell comprising:
   a female receptacle having an open generally conically-shaped framework in which an oppositely disposed pair of sides of the pliable tortilla are overlapped to form said tortilla into a conically-shaped container configuration, and
   a male retainer member having a smooth, substantially continuous generally conically-shaped exterior surface dimensioned to nestle within said female receptacle and retain said formed tortilla therein.

3. The assembly described in claim 2 wherein:
said female receptable includes a guide member having a substantially continuous inner surface forming the opening into the interior of said receptacle, said guide member facilitating guiding the pliable tortilla into said receptacle.

4. The assembly described in claim 3 wherein:
said guide member is a ring whose plane is generally perpendicular to the axis of said conical receptacle framework.

5. The assembly described in claim 2 wherein:
said female receptacle terminates at its bottom in an opening sufficiently large that the vertex of the formed tortilla extends therethrough.

6. The assembly described in claim 2 wherein:
said female receptacle includes a circumferential member vertically located proximate the middle of the tortilla and its overlapping sides when the tortilla is positioned in said receptacle, said circumferential member facilitating removal of the stiff shell from the receptacle by preventing the exterior one of said overlapping sides from extending through the open framework to the exterior thereof.

7. The assembly described in claim 6 wherein:
said circumferential member is a ring whose plane is generally perpendicular to the axis of said conical receptacle framework, said ring being located around said receptacle framework in a vertical position proximate the middle of the tortilla and its overlapping sides when the tortilla is positioned in said receptacle.

8. The assembly described in claim 2 wherein:
said female receptacle comprises a plurality of horizontal spaced rings of increasing diameter and a plurality of upright rods extending from the ring of smallest diameter to the ring of largest diameter and respectively affixed to said rings in a spaced apart manner around the circumference of said rings.

9. The apparatus described in claim 8 wherein:
said ring of largest diameter is located at the mouth of said receptacle and interior of said upright rods for providing a means for facilitating guiding said tortilla into said receptacle.

10. The apparatus described in claim 8 wherein:
said ring of smallest diameter has an opening sufficiently large that the vertex of the formed tortilla extends therethrough.

11. The apparatus described in claim 2 wherein:
a plurality of said female receptacles are joined together in the same plane and a plurality of said male retainer members are joined in unison in positions respectively corresponding to the female receptacles.

12. The apparatus described in claim 11 including:
an assembly secured across the top mouths of said retainer members for providing a handle for said members and increasing the overall rigidity of the grouping of said members.

13. The assembly described in claim 11 having:
a base, and
an assembly including an upright portion attached to said base and said joined receptacles for supporting said receptacles above said base, a portion of said assembly being located in a substantially horizontal plane for providing a handle for manipulating said receptacles.

14. An assembly for supporting a pliable tortilla totally submerged in a liquid, heated cooking medium so that said tortilla is changed into a crisp, stiff conically-shaped shell comprising:
receptacle means for supporting said pliable tortilla in a generally conical configuration, said means being substantially open to said cooking medium so that said medium freely flows to and around said tortilla, and
male retainer means having an exterior portion suitably dimensioned to be inserted within said pliable tortilla for retaining said tortilla in said conical configuration while submerged in said cooking medium.

15. An apparatus for supporting a pliable tortilla totally submerged in a liquid, heated cooking medium so that said tortilla is changed into a crisp, stiff conically-shaped shell comprising:
a first assembly including a plurality of female receptacles, each female receptacle supporting said pliable tortilla in a generally conical container configuration with a substantially closed vertex, an open mouth and overlapping sides, each of said female receptacles comprising a plurality of spaced rings of increasing diameter and a plurality of upright rods extending from the ring of smallest diameter to the ring of largest diameter and respectively affixed to said rings in a spaced-apart manner around the circumference of said rings, said ring of largest diameter being located proximate the upper end of said rods and said rods being affixed to the outer circumference of said ring of largest diameter and the inner circumference of said other rings, one of the other of said rings being vertically located proximate the middle of the tortilla and its overlapping sides for preventing the exterior one of said overlapping ends from extending between adjacent ones of said rods to the exterior of said receptacle, and said ring of smallest diameter having an opening sufficiently large that the vertex of the formed tortilla extends therethrough, and
a second assembly comprising a plurality of joined male retainer members each having a smooth, substantially continuous truncated conical-shaped exterior surface dimensioned to nestle within said female receptacle proximate the interior surface of said pliable tortilla for retaining said tortilla in said conical configuration while said tortilla is submerged in said cooking medium.

16. The apparatus described in claim 15 comprising: a base for said first assembly;

means including an upright portion attached to said base and said first assembly for supporting said female receptacles above said base, a portion of said means being located in a substantially horizontal plane for providing a handle for manipulating said receptacles; and means secured to said second assembly across the top mouths of said male retainer members for providing a handle for said male members and increasing the overall rigidity of the grouping of said male members.

References Cited

UNITED STATES PATENTS

| | | | |
|---|---|---|---|
| 1,293,819 | 2/1919 | Lewison | 99—383 |
| 2,570,374 | 10/1951 | Pompa. | |
| 2,664,812 | 1/1954 | Molina | 99—426 |
| 2,719,480 | 10/1955 | Prickett et al. | 99—426 |
| 2,740,349 | 4/1956 | De Gonia | 99—426 |
| 2,778,294 | 1/1957 | Ulloa | 99—426 |
| 2,792,774 | 5/1957 | Veach | 99—426 |
| 2,847,933 | 8/1958 | Pate | 99—426 |
| 2,957,405 | 10/1960 | Maldonado | 99—426 |
| 2,967,474 | 1/1961 | Ford | 99—427 XR |
| 3,020,826 | 2/1962 | Silva | 99—426 |

BILLY J. WILHITE, *Primary Examiner.*

U.S. Cl. X.R.

99—426, 1; 107—54